United States Patent
Yung et al.

(10) Patent No.: US 11,157,493 B2
(45) Date of Patent: Oct. 26, 2021

(54) OPTIMISTIC DATA FETCHING AND RENDERING

(71) Applicant: Facebook, Inc., Menlo Park (CA)

(72) Inventors: Timothy Robert Yung, Sunnyvale, CA (US); Jing Chen, Mountain View, CA (US); Lewis Marshall Roch, IV, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 855 days.

(21) Appl. No.: 15/394,743

(22) Filed: Dec. 29, 2016

(65) Prior Publication Data

US 2017/0193042 A1 Jul. 6, 2017

Related U.S. Application Data

(60) Provisional application No. 62/273,341, filed on Dec. 30, 2015.

(51) Int. Cl.
*G06F 16/2453* (2019.01)
*G06F 16/248* (2019.01)
*G06F 16/951* (2019.01)

(52) U.S. Cl.
CPC ........ *G06F 16/2453* (2019.01); *G06F 16/248* (2019.01); *G06F 16/951* (2019.01)

(58) Field of Classification Search
CPC .............. G06F 16/2453; G06F 16/951; G06F 16/9574; G06F 16/24539; G06F 16/248; G06F 16/338; G06F 16/95; G06F 16/9538; G06F 16/9577; G06F 16/958

USPC .......................................... 715/234; 707/721
See application file for complete search history.

(56) References Cited

U.S. PATENT DOCUMENTS

| | | | | |
|---|---|---|---|---|
| 6,182,133 B1 * | 1/2001 | Horvitz | ............... | G06F 16/9574 709/223 |
| 6,665,658 B1 * | 12/2003 | DaCosta | ............... | G06F 16/951 |
| 7,743,064 B2 * | 6/2010 | Faulkner | ................ | G06F 16/78 707/758 |
| 8,019,770 B1 * | 9/2011 | Hartsook | .............. | G06F 16/972 707/759 |
| 8,577,913 B1 * | 11/2013 | Hansson | ................ | G06F 3/048 707/767 |
| 8,694,504 B2 * | 4/2014 | Beretich, Jr. | ......... | G06F 16/358 707/737 |
| 2005/0246326 A1 * | 11/2005 | McKeon | ................. | G06F 16/10 |
| 2009/0094137 A1 * | 4/2009 | Toppenberg | ........... | G06Q 30/02 705/26.1 |

(Continued)

*Primary Examiner* — Dennis Truong
(74) *Attorney, Agent, or Firm* — FisherBroyles, LLP

(57) ABSTRACT

Embodiments are disclosed for fast data fetching and rendering. In some embodiments, in response to receiving a page display request, a system constructs a static, possibly nested query for retrieving all the data to be rendered for the page and stores the query result in a data store. For a future page display request, the system similarly constructs a query and determines whether the query can be resolved from the data store. If not, the system constructs a "diff query" to fetch only the missing data. In some embodiments, in response to a subsequent page update request, the system retrieves from the server all the data likely to be viewed or updated and renders the data changes corresponding to the requested update. The system then submits the data changes to the server and undoes the rendering of the data changes when the server fails to process the data changes.

20 Claims, 15 Drawing Sheets

(56) References Cited

U.S. PATENT DOCUMENTS

| | | | | |
|---|---|---|---|---|
| 2009/0210631 A1* | 8/2009 | Bosworth | ........... | G06F 12/0875 |
| | | | | 711/141 |
| 2010/0262780 A1* | 10/2010 | Mahan | ................... | G06F 15/16 |
| | | | | 711/118 |
| 2010/0281031 A1* | 11/2010 | Voice | ................ | G06F 16/24539 |
| | | | | 707/741 |
| 2010/0332513 A1* | 12/2010 | Azar | ................. | G06F 16/24545 |
| | | | | 707/769 |
| 2011/0137933 A1* | 6/2011 | Pelenur | ............... | G06F 16/9577 |
| | | | | 707/769 |
| 2012/0110002 A1* | 5/2012 | Giambalvo | ............ | G06F 16/26 |
| | | | | 707/769 |
| 2012/0151000 A1* | 6/2012 | Snodgrass | ........... | H04L 67/2847 |
| | | | | 709/217 |
| 2013/0018869 A1* | 1/2013 | Hanson | ................ | G06F 16/958 |
| | | | | 707/722 |
| 2013/0073532 A1* | 3/2013 | Bachar | ..................... | G06F 7/32 |
| | | | | 707/704 |
| 2013/0144899 A1* | 6/2013 | Lee | ........................ | G06Q 50/01 |
| | | | | 707/759 |
| 2013/0290203 A1* | 10/2013 | Purves | ................... | G06Q 50/01 |
| | | | | 705/319 |
| 2014/0006951 A1* | 1/2014 | Hunter | ................ | H04N 21/431 |
| | | | | 715/719 |
| 2014/0040368 A1* | 2/2014 | Janssens | ............... | H04L 67/306 |
| | | | | 709/204 |
| 2014/0129966 A1* | 5/2014 | Kolesnikov | ........... | G06F 3/0482 |
| | | | | 715/765 |
| 2014/0136951 A1* | 5/2014 | Kumar | .................. | G06F 40/106 |
| | | | | 715/234 |
| 2014/0317184 A1* | 10/2014 | Weaver | .................. | G06Q 10/10 |
| | | | | 709/204 |
| 2015/0169580 A1* | 6/2015 | Epstein | ................. | G06F 16/951 |
| | | | | 707/749 |
| 2016/0350305 A1* | 12/2016 | Shen | ..................... | G06F 16/172 |
| 2017/0329845 A1* | 11/2017 | Epstein | ................ | G06F 16/334 |
| 2019/0213229 A1* | 7/2019 | Chen | ..................... | G06F 16/176 |

* cited by examiner

```
// NewsFeed.react.js
class NewsFeed extends React.Component {
  render() {
    var stories = this.props.viewer.stories; // `viewer` is the active user
    return (
      <View>
        {stories.map(story => <Story story={story} />)}
        <Button onClick={() => this.loadMore()}>Load More</Button>
      </View>
    );
  }
}
module.exports = NewsFeed;
```

*FIG. 3*

```
module.exports = Relay.createContainer(NewsFeed, {
  queryParams: {
    count: 3                                    /* default to 3 stories */
  },
  queries: { 404
    viewer: graphql`
402
      Viewer {                      408
        stories(first: <count>) {               /* fetch viewer's stories */
      406
          edges {                               /* traverse the graph */
            node {                  410
              ${Story.getQuery('story')}        /* compose child query */
            }
          }
        }
      }
    `
  }
});
```

*FIG. 4*

```
// Story.react.js class Story extends React.Component { ... } module.exports = Relay.createContainer(Story, { queries: {

502     story: graphql`
                        506
504     Story {
            author { name, profile_picture { uri

}

},   508 text

```
var FeedContainer = Relay.createContainer(Feed, {
  queryParams: {
    count: 3
  },
  queries: {
    viewer: function(route, query, params) {
      return query`                              602
        Viewer {
          news_feed.first(${params.count}) {
            edges {
              node {
                id,
                ${FeedStory.getQuery('story')},
              }
            }
          }
        }
      `;
    }
  }
});
```

*FIG. 6A*

```
var FeedbackContainer = Relay.createContainer(Feedback, {
  queryParams: {
    showComments: false
  },
  queries: {
    feedback: function(route, query, params) {
      return query`
        Feedback {
          id,                                                           606
          ${FeedbackCounts.getQuery('feedback')},
          ${CommentList.getQuery('feedback').if(params.showComments)}
        }
      `;
              604
    }
  }
});
```

*FIG. 6B*

Query History Table

| | Date | Query | Required Params | Requested Fields |
|---|---|---|---|---|
| | 802 | 804 | 806 | 808 |
| 810 | 08/05/14 | Story | author=John Doe, date=05/08/00 | Text |
| 812 | 04/20/15 | Story | author=Jane Doe, date=05/09/11 | Genre, Length |
| 814 | 04/22/15 | News Feed | source= Television News Channel, type= Business | Stories |

*FIG. 8*

Action Queue

| Transaction ID | Item | Current Value | New Value |
|---|---|---|---|
| 0 | First user profile, Like indicator | off | on |
| | First user profile, Like list | {second user, third user} | {second user, third user, fourth user} |
| | First user profile, Like count | 2 | 3 |
| 1 | First user profile, Like indicator | on | off |
| 2 | First user profile, Like indicator | off | on |

902, 904, 906, 908 label the columns; 910, 912, 914, 916, 918 label the rows.

*FIG. 9*

OPTIMISTIC DATA FETCHING AND RENDERING

CROSS-REFERENCES TO RELATED APPLICATIONS

This application claims the benefit of commonly assigned U.S. Provisional Patent Application Ser. No. 62/273,341, filed on Dec. 30, 2015, and entitled "OPTIMISTIC DATA FETCHING AND RENDERING," the disclosure of which is hereby incorporated herein in its entirety by reference.

TECHNICAL FIELD

This patent application generally relates to data fetching and rendering, and more specifically, to fetching sufficient data to reduce network bandwidth usage (e.g., by reducing network traffic) and rendering data in real time to enhance customer satisfaction.

BACKGROUND

Social networking systems commonly provide mechanisms that allow users to interact and communicate within their social networks. For example, a user may be able to send a content item to one or more other users. Content items may be uploaded to or created within many social networking system contexts, such as newsfeeds, user profiles, user walls, group pages, event pages, private messages, email messages, comment threads, message chains, photo albums, or any other social networking system context capable of displaying a content item.

The social networking systems typically comprise a combination of this user-generated content as well as user interface content of the social networking system. These contents are collectively referred to herein as "data." The data can include other information that is stored and then transformed into data that becomes visible (e.g., content).

Application developers commonly use graphical user interfaces (GUIs) provided by computing electronic devices to display data on client ("mobile") computing devices. Mobile computing devices can be handheld computing devices, e.g., "smartphones," tablet computing devices, and the like. The data can be fetched via a data communications network from remote server computing devices. In a social networking environment, for example, people rely heavily on the display of web contents through GUIs. The processing power of the remote server, the load of the networks, the complexity of the GUIs, and other factors can all contribute to potential deterioration of the GUI quality. It would be helpful to overcome such potential issues and maintain or improve GUI performance.

BRIEF DESCRIPTION OF THE DRAWINGS

The embodiments introduced here may be better understood by referring to the following Detailed Description in conjunction with the accompanying drawings, in which like reference numerals indicate identical or functionally similar elements:

FIG. 3 illustrates an example component for rendering a news feed.

FIG. 4 illustrates an example component for fetching a news feed.

FIG. 5 illustrates an example component for fetching a story.

FIG. 6A illustrates an example component for fetching a news feed similar to the one illustrated in FIG. 4.

FIG. 6B illustrates an example component for fetching a feedback.

FIG. 8 illustrates an example data structure that records the query history.

FIG. 9 illustrates an example data structure storing data changes resulting from user input before that are committed into databases.

Figure 1:
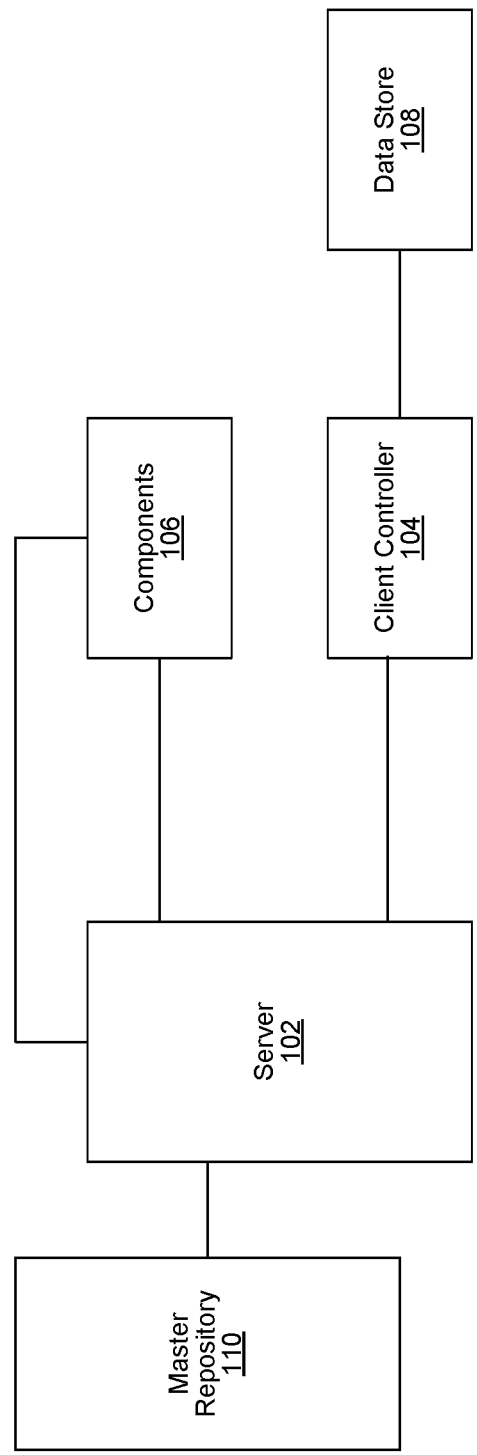
FIG. 1 illustrates a sample environment in which a data management system disclosed in the present application can operate.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Embodiments are described of an optimistic fetching and rendering system for fast data fetching and rendering. In some embodiments, in response to receiving a page display request, a system constructs a static, possibly nested query for retrieving all the data to be rendered for the page and stores the query result in a data store. Rendering involves translating data to a visual representation, e.g., on a display device of a computing device. For a future page display request, the system similarly constructs a query and determines whether the query can be resolved from the data store. If not, the system constructs a "diff query" to fetch only the missing data. A diff query can request data that has changed since results were returned for a prior query. In some embodiments, in response to a subsequent page update request, the system retrieves from the server all the data likely to be viewed or updated and renders the data changes corresponding to the requested update. The system then submits the data changes to the server and undoes the rendering of the data changes when the server fails to process the data changes.

FIG. 1 illustrates a sample environment in which a data management system disclosed in the present application can operate. In some embodiments, the client controller 104 manages different types of operations for a user. The client controller 104 typically runs (e.g., executes) on a client device, such as a desktop computer, a laptop computer, a tablet, a cellphone, a wearable device, etc. The server 102 supplies control algorithms and data to the client controller 104. The server 102 typically runs on an enterprise system that has sufficient computing and storage capabilities for managing the component database 106 and handling a number of database queries from the client controller 104.

In some embodiments, the component database 106 stores different components that describe the control logic for graphical user interface (GUI) rendering, data fetching, and other types of operations performed by the client controller 104. In particular, some of the components cover the submission of database queries to the server 102. The component database 106 can reside on the enterprise system or somewhere else accessible to the server 102. A component cache storing components received by the client controller 104 from the server 102 in response to rendering requests can reside on the client device or somewhere else accessible to the client controller 104. The master repository 110 stores all data managed by the data management system. The master repository 110 can reside on the enterprise system or somewhere else accessible to the server 102. The data store 108 stores data received by the client controller 104 from the server 102 in response to database queries. The data store 108 can reside on client device or somewhere else accessible to the client controller 104. The server 102, the client controller 104, the component database 106, and the data store 108 are interconnected via any type of network known to someone in the ordinary skill in the art, such as a cellular network or the Internet.

In some embodiments, initially, the client controller 104 receives a request from a user for a page. The client controller 104 fetches all the necessary data before rendering the page. Specifically, the client controller 104 receives appropriate components from the server 102 that define appropriate database queries for data necessary for rendering the requested page, organizes the set of appropriate database queries, and submits the organized set of database queries back to the server 102 at once. The organization can involve determining whether the set of appropriate database queries can be resolved from the data store 108. Upon a negative determination, the client controller 104 replaces the set of appropriate database queries by a subset for only data that are not already present in the data store 108. Next, the client controller 104 receives the query results from the server 102 and saves the query results in the data store 108. The client controller 104 then renders the page using the data available in the data store 108.

In some embodiments, the client controller 104 receives a request from a user to update the page. The client controller 104 displays the requested change and related changes to the user before submitting all the changes to the server 102 for updating the master repository 110. Specifically, the client controller 104 identifies the related changes, keeps track of all the changes in a queue or any appropriate data structure, and determines whether to commit the changes in the data store 108 depending on whether the update of the master repository 110 is successful. If the update succeeds, the client controller 104 stores the changes in the data store 108. If the update fails, the client controller 104 shows an error message to the user and withdraws the requested change from the display. The client controller 104 can also resubmit the changes to the server 102.

Figure 2:
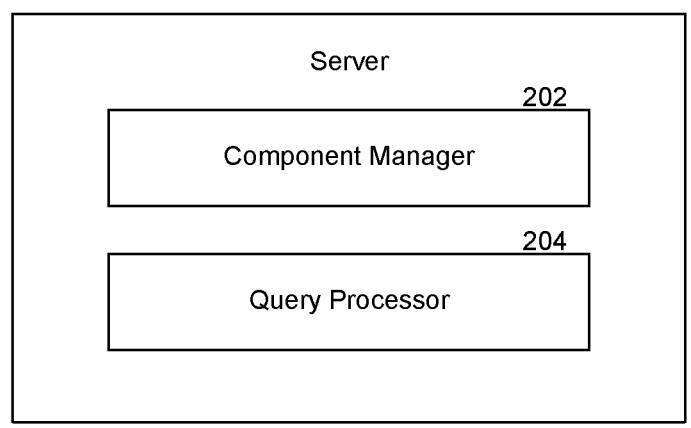
FIG. 2 illustrates example modules of a server disclosed in the present application.

FIG. 2 illustrates example modules of a server disclosed in the present application. In some embodiments, the server comprises a component manager 202 and a query processor 204. The component manager 202 manages the organization and recordation of components in the component database. The query processor 204 executes the database queries submitted by the client controller and returns the query results to the client controller.

In some embodiments, the component manager 202 requires that control logic for different types of operations be captured in separate components. For example, the control logic for rendering a news feed and the control logic for fetching the news feed before rendering are to be captured in two separate components. This requirement enables one type of operation to be performed without affecting the another type of operation. The component manager 202 further requires that the components related to the same type of data be recorded in the same file. For example, the component describing the control logic for rendering a news feed and the component describing the control logic for fetching the news feed before rendering are to be recorded in the same file. This requirement enables efficient verification of consistency and accuracy across different types of operations performed on the same type of data. In addition, the component manager 202 enables the composition of components and thus the establishment of a hierarchy of components.

In some embodiments, the component manager 202 requires the definition of components that fetch a set of related items through a "group query". The set of items are related in the sense that when one of them is viewed or updated, any other item in the set is likely to be viewed or updated. For example, one such set of related items can include a profile of a first user, data related to viewing of the profile, data related to liking of the profile, data related to comments on the profile, and data related to a second user taking an action on the first user's profile. The group query helps reduce the number of communications with the server by returning the set of related items at once to a client, as further discussed below.

In some embodiments, the component manager 202 requires that the control logic for rendering a specific type of data includes an indication of causal relationships where a change of this type of data causes a chance of another type of data. For example, in response to the second user Liking the first user's profile, a list of users who like the first user's profile and a count of the total number of Likes for the first user's profile would need to be updated. The detection of casual relationships facilitates the propagation of data changes and helps ensure the consistency in the rendering of different pages, as further discussed below. Information regarding causal relationships can also be incorporated into those components that describe the control logic for fetching data (and eventually passed onto the components that describe the control logic for rendering data) or stored separately from the components.

FIG. 3 illustrates an example component for rendering a news feed. This first component contains a "render" function 302 for the rendering. The first component includes a property of a "viewer" 304, which includes a list of "stories" 306.

FIG. 4 illustrates an example component for fetching a news feed. This second component, which is separate from but is recorded in the same file as the first component for rendering the news feed, includes a "query" 402 for what is inside the "viewer" 404 for the news feed, including the list of "stories" 406. The second component generally defines a static database query, but it allows flexibility with the incorporation of parameters. While the database query requests a specific set of fields, such as the list of stories, it requests a variable number of instances or a partial value through a parameter "count" 408, such as the number of stories. The second component also invokes another component "story" 410, forming a composition relationship, to further lay out the database query for each of the number of stories.

FIG. 5 illustrates an example component for fetching a story. This third component includes a "query" 502 for what is inside a "story" 504, including an author of the story 506 and the text 508 of the story. The second component can form a composition relationship with this third component.

FIG. 6A illustrates an example component for fetching a news feed similar to the one illustrated in FIG. 4. The database query defined in this fourth component similarly contains several parameters, including a parameter "count" 602. FIG. 6B, to be contrasted with FIG. 6A, illustrates an example component for fetching a feedback. This fifth component allows additional flexibility to a static database query by requesting a variable number of fields. Specifically, whether the database query requests the last field of a list of "comments" 604 depends on whether the value of a parameter "showComments" 606 corresponding to a checkbox is true.

Figure 7:
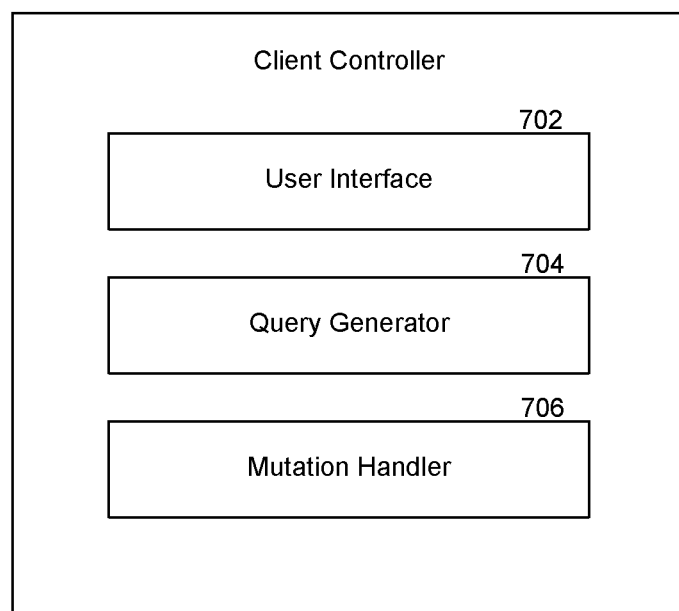
FIG. 7 illustrates example modules of a client controller disclosed in the present application.

FIG. 7 illustrates example modules of a client controller disclosed in the present application. In some embodiments, the client controller comprises a user interface 702, a query generator 704, and a mutation handler 706. The user interface 702 accepts requests for pages from a user, outputs page renderings to a user, and accepts input into the page renderings from the user. The query generator 704, in response to user requests to display or update pages, generates database queries to fetch data necessary for rendering the requested items from the server. The mutation handler 706 handles data changes in response to user input into rendered pages.

In some embodiments, the user interface 702 initially receives a user request for a page. When the page is a webpage, the request can be in the form of a URL. The user interface 702 passes the request to the query generator 704 to fetch the data necessary for rendering the page from the server.

In some embodiments, the query generator 704 converts the user request to a top-level database query. When the page is a webpage, the query generator 704 can analyze the URL to identify the top-level database query. For example, when the URL matches the word "profile", the query generator 704 determines that the requested page shows a user profile, which can contain a photo and some demographic information, and identifies the top-level database query that corresponds to the structure of a user profile. Similarly, when the requested page shows a news feed, which can contain a list of stories, the query generator 704 identifies the top-level database query that corresponds to the structure of a news feed.

In some embodiments, the query generator 704 then expands the top-level database query based on the composition relationships to collect an entire hierarchy of database queries for fetching all the data necessary for rendering the requested page. For example, in reference to FIG. 4 discussed previously, the query generator 704 starts with the top-level database query for a viewer associated with a specific news feed, proceeds to identify the query for a list of stories, and proceeds further to identify the query for each of the stories. The query generator 702 can traverse the hierarchy in a breadth-first manner or a depth-first manner.

In some embodiments, the query generator 704 reorganizes the collected set of database queries before contacting the server for query execution. The query generator 704 examines the set of database queries and eliminates duplicate ones. For example, when the requested page contains multiple references to the same user, the query generator 704 needs to include only one database query for data related to that user. In addition, the query generator 704 reviews query history and eliminates certain database queries according to the query history, such as database queries that were recently executed by or submitted to the server. The results of these database queries can already be available locally.

FIG. 8 illustrates an example data structure that records the query history. In some embodiments, the query generator 704 can maintain a query history table in the data store to record each database query and corresponding values of required parameters submitted to the server. The query history table can contain a date column 802 indicating when the database query was submitted to the server or when the database query result was received from the server, a query column 804 identifying the query, a requested fields column 808 indicating the requested fields, and a required parameters column 806 indicating values of the required parameters. Generally, the query column 804 refers to an item, which can be displayed in the GUI, the requested fields column 808 refers to certain properties of that item, and the required parameters column 806 contains values for identifying the item. For example, according to the record 810, a query was submitted for the text of the story written by John Doe on May 8, 2000; according to the record 812, a query was submitted for the genre and length of the story written by Jane Doe on May 9, 2011; according to the record 814, a query was submitted for the stories of the news feed from the "Business" section of a Television News Channel.

In some embodiments, as further discussed below, the query generator 704 stores query results in the data store. In general, the query generator 704 adds an entry to the query history table for a database query before or after the database query is submitted to the server for execution or before or after the result is saved in the data store. The query generator 704 then removes an entry when the query cannot be executed successfully or when certain data retention rules are met. As such, the query history table can also include a link in each entry to the corresponding database query result in the data store. When a database query leads to a hierarchy of database queries, an entry is added to the query history table for each of the individual queries, which can then be referenced from the query history table separately.

In some embodiments, based on the query history table, the query generator 704 determines whether the result of executing any database query included in the collected set of database queries is or will soon be available in the data store. Upon a positive determination, the query generator 704 eliminates the database query from the collected set of queries. In reference to FIG. 8, as one example, the query generator 704 can eliminate a query for the genre of the story written by Jane Doe on May 9, 2011. As another example, the query generator 704 can replace a query for the text and editor of the story written by John Doe on May 8, 2000 by a query for only the editor of the story.

In some embodiments, the query generator 704 sends the reorganized set of queries to the server for execution, and receives a set of query results. The query generator 704 updates the query history table as appropriate and stores the set of query results in the data store. In this manner, the query generator 704 makes all the data necessary for rendering the requested page available in the data store, regardless of whether the query result is previously available in the data store or newly received from the server, before any rendering takes place.

In some embodiments, the user interface 702 ultimately receives the data necessary for rendering the page requested by the user. The user interface 702 then renders the requested page using the data in the data store for viewing by the user. Similar to the query generator 704, the user interface 702 starts by rendering the result of executing the top-level database query and traverses the corresponding hierarchy in a breadth-first or depth-first manner. To render the result of executing each database query in the hierarchy, the user interface 720 retrieves only the data requested by the database query from the data store without following any composition relationship.

In some embodiments, after the requested page is displayed, the user can interact with the page. For example, when the requested page is a webpage showing a first user's profile, a second user can indicate whether to Like the first user's profile on the same page. For any user input, the user interface 702 first shows an optimistic payload, namely what the user would expect to see, including the input itself and any rendering changes triggered by the input. To highlight the optimistic and possibly temporary nature, the user interface 702 can present the optimistic payload in a way that distinguishes it from the rest of the page, such as having a different background color.

In some embodiments, the query generator 702 then identifies a group query that covers the item affected by the user input. For example, the item can be the first user's profile, and the user input can be the second user indicating a Like of the first user's profile. As discussed above, the group query requests a group of related items where the viewing or update of one of the items can trigger the viewing or update of the others. By submitting the group query to the server, the query generator 702 acquires access to all the data that is likely to be used by the user as a result of the user input and can save some future communications with the server. Some of the group query result may already be available in the data store. For example, the data necessary for rendering the present page with which the user is interacting is generally already available in the data store. Therefore, the query generator can submit a reduced version of the group query to the server depending on what is in the data store. Subsequently, the query generator 704 receives the group query result, updates the query history table as appropriate, and stores the group query result in the data store.

In some embodiments, the mutation handler 706 determines what data changes need to be made in response to the user input. As discussed above, information regarding causal relationships can be available from the components. For example, in response to the second user Liking the first user's profile, a list of users who like the first user's profile and a count of the total number of Likes for the first user's profile would need to be updated. None, one, or both of the list and the count may be included in the present page or another page. The mutation handler 706 then retrieves the relevant data from the data store and applies the determined changes to the retrieved data. Instead of immediately saving the changed back into the data store, the mutation handler 706 first ensures that these data changes can be committed by the server into the master repository.

FIG. 9 illustrates an example data structure storing data changes resulting from user input before that are committed into databases. In some embodiments, the mutation handler 706 saves an entry for each of the determined data changes into an action queue to achieve synchronization on the server. The entry can include a transaction ID 902 that identifies a set of data changes resulting from the same user input, item information 904 identifying a target item to be changed, the current value 906 of the target item, and the new value 908 of the target item. For example, entries 910-914 are associated with the same transaction. In the entry 910, the target item is the Like indicator associated with the second user for the first user's profile, the current value is off, and the new value is on. In the entry 912, the target item is the list of users who have Liked the first user's profile, the current value is the list of the third user and the fourth user, and the new value is the current value with the addition of the second user. In entry 914, the target item is the number of users who have Liked the first user's profile, the current value is two, and the new value is three. After the second user provides an initial input to the requested page and sees the updated page, the second user may provide further inputs, possibly before the initial input is fully processed. For example, the second user may keep changing his or her mind and unchecks but then checks again the Like indicator. The entries 916 and 918 reflect those subsequent user inputs. (Additional entries associated with those two transactions are not shown.)

In some embodiments, the mutation handler 706 de-queues a set of all entries having the same transaction ID from the action queue and submits the data changes contained in these entries to the server at once for storage in the master repository. Generally, the mutation handler 706 waits until a response is returned from the server indicating whether the data changes are successfully committed into the master repository before taking further action to ensure that the data changes are committed in order. If the server response indicates a failure, the mutation handler 706 can resubmit the set of entries for a certain number of times. If the server response continues indicating a failure, the mutation handler 706 instructs the user interface 702 to revert to the previous display using appropriate data in the submitted entries and optionally show an error message. Furthermore, the mutation handler 706 removes from the action queue every entry having the same target item as the target item of any of the submitted entries, as these entries were en-queued assuming an optimistic payload. The mutation handler 706 can also en-queue all the removed entries again for resubmission to the server later.

In some embodiments, if the server response indicates a success, the mutation handler 706 de-queues another set of entries and repeats the process. The mutation handler 706 also saves the successful data changes in the data store. The mutation handler 706 can keep a separate, less transient record of submitting the data changes to track the data changes stored in the data store. The mutation handler can achieve this purpose by updating the query history table, in which case the table can include a type column, for example, indicating whether the data are database query results or data changes, or working with a separate user interaction history table. The submitted data changes can then be accessed just as other query results. The mutation handler 706 can add entries to and remove entries from the query history table for each data change in the same way as it does for each database query.

Figure 10:
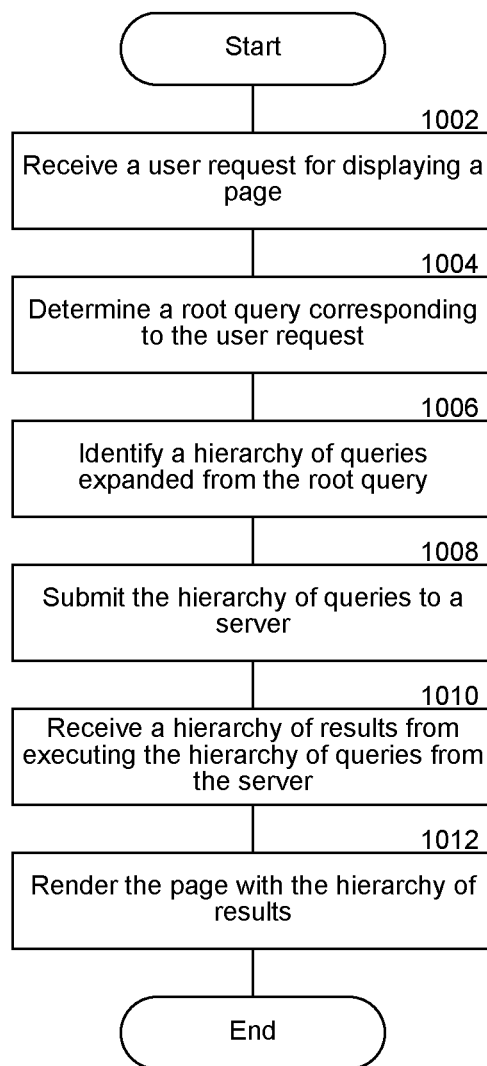
FIG. 10 illustrates a process performed by the client controller of processing a user request for display a page.

FIG. 10 illustrates a process performed by the client controller of processing a user request for displaying a page. In some embodiments, in step 1002, the client controller receives a request from a user for displaying a page. In step 1004, the client controller identifies a top-level data query corresponding to the user request. As different types of data are represented as different objects that are connected through composition relationships, data queries are typically developed in a hierarchical manner following the structure of the data. In step 1006, the client controller then builds the hierarchy of data queries that can be expanded from the top-level data query. The client controller can now reorganize the set of data queries by removing duplicates or those whose results are already available in a local database. The client controller can further enhance the set of data queries through various optimization techniques known to someone of ordinary skill in the art.

In some embodiments, in step 1008, the client controller submits the cleaned-up set of data queries to the server. By submitting the entire hierarchy or a sufficient subset, the client controller receives all the necessary data at once from the server and reduces the number of network trips. In step 1010, the client controller receives from the server a corresponding set of results from executing the set of data queries. The client controller then saves the set of results into the local database. In step 1012, the client controller renders the page using the hierarchy of data corresponding to the original hierarchy of data queries. The client controller can similarly perform the rendering in stages by following the structure of the data. For example, when a part of the page is not visible to the user because the enclosing item is in a collapsed state or because the part is outside the display window, the client controller does not need to render that part of the page.

Figure 11:
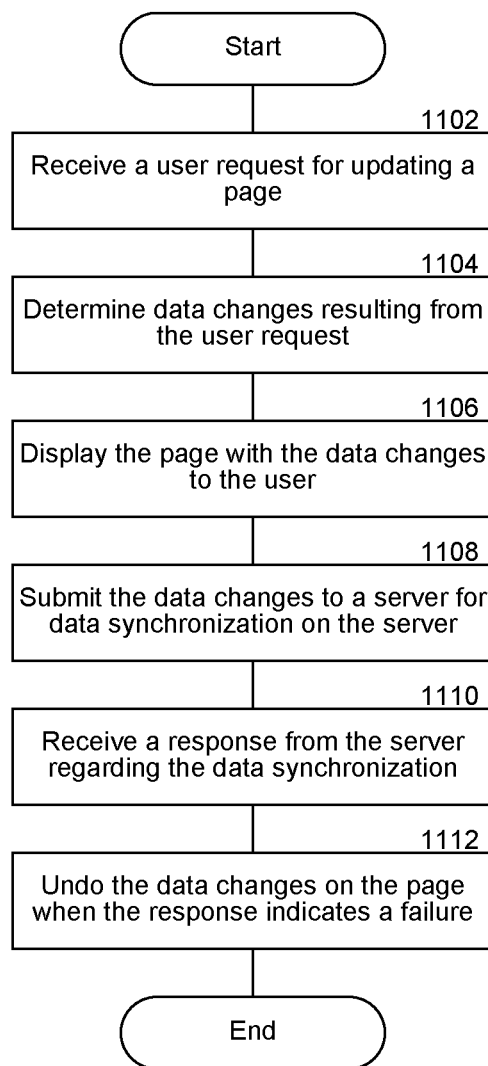
FIG. 11 illustrates a process performed by the client controller of handling a user request for updating a page.

FIG. 11 illustrates a process performed by the client controller of handling a user request for updating a page. In some embodiments, in step 1102, the client controller receives a request from a user for updating a page that is currently displayed to the user. For example, a webpage can have fields that accept user input. The request can correspond to data inputted by the user to one of the fields. In step 1104, the client controller identifies all the data that will be changed due to the request. For example, when the user leaves a comment on a page, not only is the comment considered as new data, the list of names and the number of people who have left a comment on the page also need to be updated. See FIG. 12 for further detail. In step 1106, the client controller updates the page with the changed data and displays the updated page to the user, before the data changes are processed by the server. This provision of an optimistic payload enables the user to see the updates without delay. To eliminate the need to perform a rollback in the local database, the client controller can save the data changes in a local queue before updating the display and only commit the data changes to the local database when they have been successfully processed by the server. To enable a reversion of the display, the data changes can be saved together with the current data.

In some embodiments, in step 1108, the client controller submits the data changes to the server to commit the data changes to a global database accessible to other client controllers. The client controller can submit the data changes in the local queue in order by de-queuing items from the local queue for each server submission. In step 1110, the client controller receives a response from the server indicating whether the attempt to commit the data changes to the global database was successful. Various reasons could have caused a failure. For example, the data changes might conflict with certain data changes that have recently been made in the global database, or a network error might prevent the data changes from ever reaching the server. Depending on the actual reason, the client controller can determine whether to retry immediately or at a later time. When none of the attempts ends in a success, the client controller removes the updates from the display and sends an error message to the user. See FIG. 13 for further detail.

Figure 12:
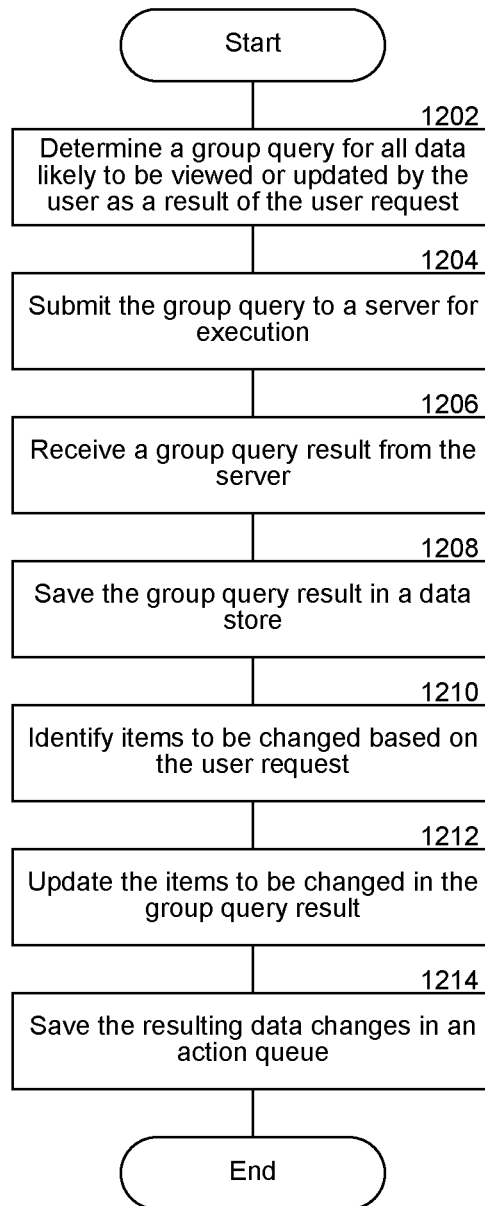
FIG. 12 illustrates a process performed by the client controller of managing data in response to user input.

FIG. 12 illustrates a process performed by the client controller of managing data in response to user input. In step 1202, the client controller identifies a group query from a list of specific group queries for all the data likely to be viewed or updated by a user as a result of a request from the user to update a page. For example, when the user leaves a comment on a page, the user might want to Like the page or view the profile of the author of the page. By retrieving most or all the data of interest at once through the group query, the client controller reduces the number of network trips. The client controller can submit a reduced version of the group query depending on what is already available in the local database. In step 1204, the client controller submits the identified group query or a reduced version thereof to the server for execution. In step 1206, the client controller receives a result of executing the submitted query from the server. In step 1208, the client controller saves the query result in the local database for current and future use. For example, if the query result includes the profile of the author of the page, when the user requests to view that profile later, the client controller can retrieve the profile from the local database without having to request it from the server at the time. In step 1210, the client controller then identifies all the items that will be changed due to the user request, which would typically constitute a subset of the group query result. In step 1212, the client controller retrieves those items from the local database and applies the changes. In step 1214, the client controller adds the changed data to the local queue for submission to the server.

Figure 13:
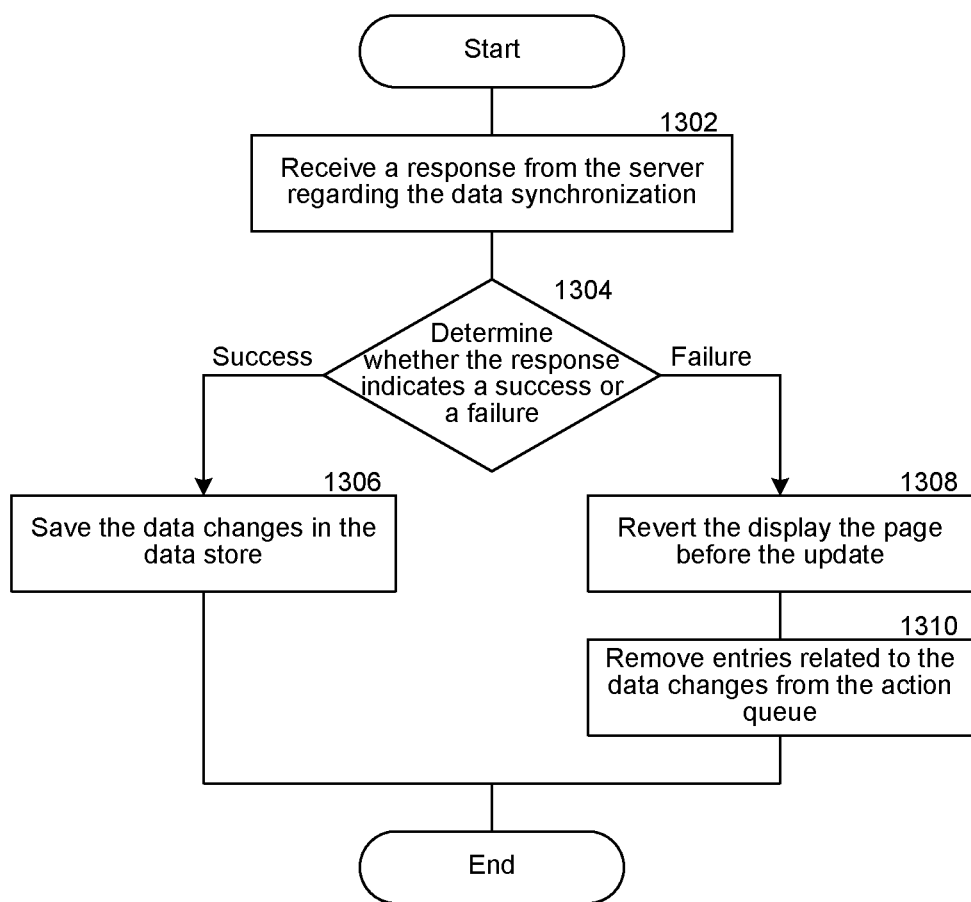
FIG. 13 illustrates a process performed by the client controller of handling results of processing data changes by the server.

FIG. 13 illustrates a process performed by the client controller of handling results of processing data changes by the server. In some embodiments, in step 1302, the client controller receives a response from the server regarding committing certain data changes to the global database. In step 1304, the client controller determines whether the response indicates a success or a failure. When the response indicates a success, in step 1306, the client controller commits the data changes to the local database. As the display already shows updated page contents, the client controller does not need to do anything further. When the response indicates a failure, the client controller can resubmit the data changes to the server immediately or later by reinserting them into the local queue. After a certain number of failures or a certain amount of time or according to some other criterion, the client controller stops trying and handle the consequences.

In some embodiments, in step 1308, the client controller reverts the page display to the previous state by removing the updates from or triggered by the user input. The client controller can do so using the past values (present values at the time) stored into and de-queued from the local queue together with the data changes. In step 1310, the client controller further cleans up the local queue, which may contain items that depend on the data changes being processed by the server. For example, after leaving a one-line comment, the user can decide to add a second line. However, if the first line cannot be processed by the server, the data change corresponding to the second line should not be submitted. Therefore, the client controller deletes from the local queue those items that depend on the data changes being processed by the server.

Those skilled in the art will appreciate that the logic illustrated in FIG. 2 and described above, and in each of the flow diagrams discussed below, may be altered in various ways. For example, the order of the logic may be rearranged, substeps may be performed in parallel, illustrated logic may be omitted, other logic may be included, etc.

Figure 14:
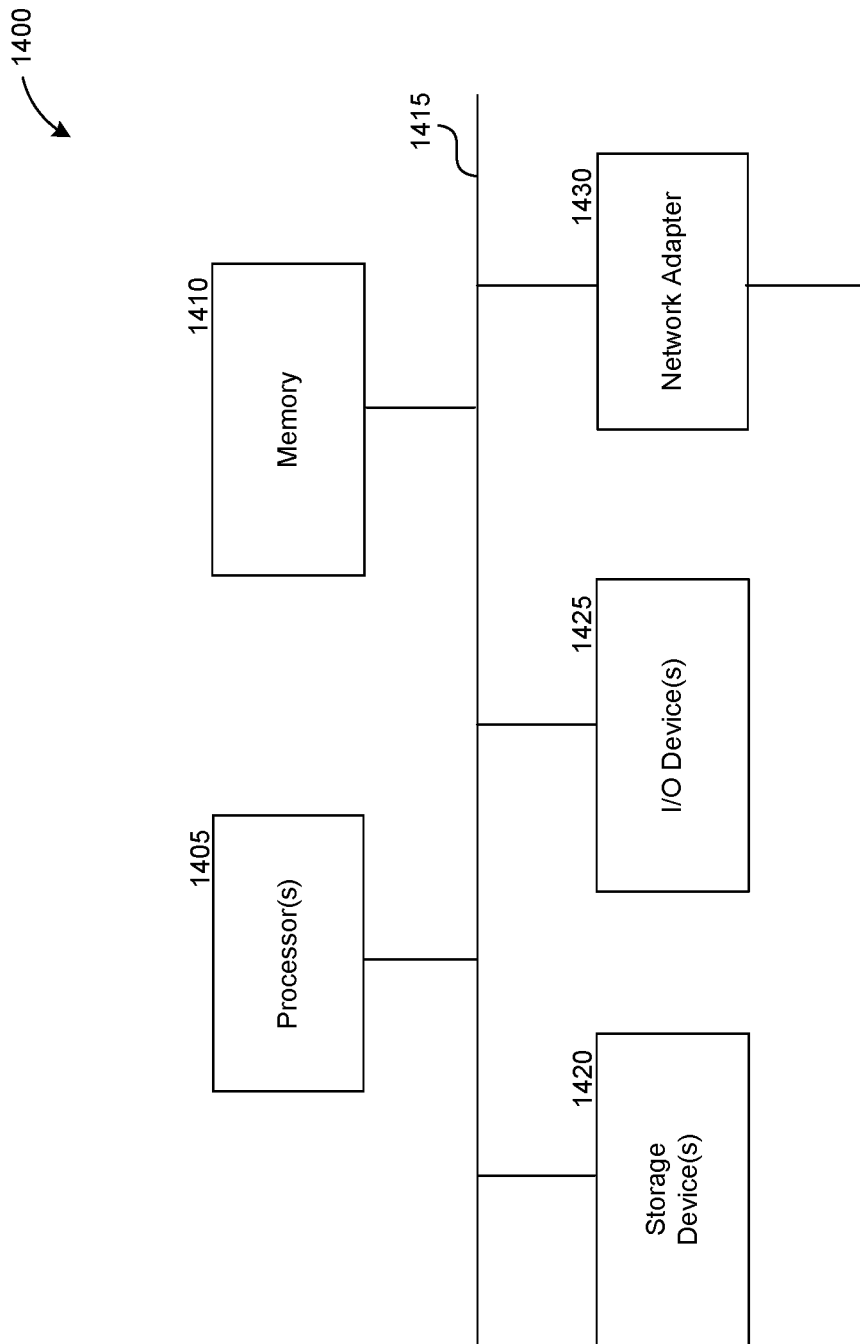
FIG. 14 is a block diagram illustrating example modules of a computer system that may be used to implement various features of the embodiments.

FIG. 14 is a block diagram illustrating example modules of a computer system that may be used to implement various features of the embodiments. The computing system 1400 may include one or more central processing units ("processors") 1405, memory 1410, input/output devices 1425 (e.g., keyboard and pointing devices, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 1415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1494 bus, also called "Firewire".

The memory 1410 and storage devices 1420 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1410 can be implemented as software and/or firmware to program the processor(s) 1405 to carry out actions described above. In some embodiments, such software or firmware may be initially provided to the processing system 1400 by downloading it from a remote system through the computing system 1400 (e.g., via network adapter 1430).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

In various embodiments, the disclosed embodiments implement a method of detecting anomalies in time series data, comprising: modeling a time series using a linear regression framework; representing the time series as a sum of a signal portion and a noise, wherein the signal portion corresponds to time-dependent data, and the noise removes time dependence from the data; calculating, for a specified time, a variance of a difference between a value of the time series predicted by the linear regression framework and a value of the signal portion; determining a threshold based on the calculated variance; and raising an alarm when a difference between a value of the time series predicted by the linear regression framework and an observed value of the time series for the specified time is larger than the threshold.

The modeling can include fitting the linear regression framework using a least squares approach with a non-negative form of regularization. The method can include calculating includes deriving the variance as a sum of a first variance of a difference between a value of the signal portion and a value of the signal portion estimated by the linear regression framework for the time point, and a second variance. The first variance can be estimated from values of the time series determined to contain no anomalies. The linear regression framework can be defined by a plurality of weights respectively associated with a plurality of past time periods, and the second variance can be estimated as a sum of, over a plurality of time periods, a product of, a square of the weight and a difference of, a square of, a difference between a value of the time series estimated by the linear regression framework and a value of the time series, and the first variance, for each of the time periods. The determined threshold can be five times the square root of the calculated variance.

In various embodiments, the embodiments can include a computer-readable storage medium storing computer-executable instructions that, when executed, cause a computer to perform a method of detecting anomalies in time series data, comprising: instructions for modeling a time series using a linear regression framework; instructions for representing the time series as a sum of a signal portion and a noise, wherein the signal portion corresponds to time-dependent data, and the noise removes time dependence from the data; instructions for calculating, for a specified time, a variance of a difference between a value of the time series predicted by the linear regression framework and a value of the signal portion; instructions for determining a threshold based on the calculated variance; and instructions for raising an alarm when a difference between a value of the time series predicted by the linear regression framework and an observed value of the specified time is larger than the threshold.

In various embodiments, the embodiments implement a system for detecting anomalies in time series data, comprising: a modeling component configured to model a time series using a linear regression framework; a representing component configured to represent the time series as a sum of a signal portion and a noise, wherein the signal portion corresponds to time-dependent data, and the noise takes the data out of time dependence; a calculating component configured to calculate a variance of a difference between a value of the time series estimated by the linear regression framework and a value of the signal portion for a time point; a determining component configured to determine a threshold based on the calculated variance; and an alarm component configured to raise an alarm when a difference between a value of the time series estimated by the linear regression framework and an observed value of the time series for a time point is greater than the threshold.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, by using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage," and that the terms may on occasion be used interchangeably.

Consequently, alternative language and synonyms may be used for any one or more of the terms discussed herein nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method performed by a client system of retrieving data managed by a server for graphical rendering, comprising:

receiving, by a client system, a request for a webpage including graphical content;

collecting a hierarchy of database queries for fetching data used for rendering the webpage by:

converting a uniform resource locator for the webpage into a top-level database query; and expanding the top-level database query based on composition relationships to collect the hierarchy of database queries for fetching the data used for rendering the requested webpage;

submitting via a data communications network the hierarchy of database queries in a batch to the server;

receiving, from the server, a set of query results corresponding to the hierarchy of database queries;

transforming the set of query results to the graphical content; and displaying the graphical content using the set of query results;

receiving, by the client system, user input interacting with the graphical content;

displaying, in response to receiving the user input, an optimistic payload of what a user would expect to see in response to the request for the webpage to enable the user to see data changes prior to the data changes being processed by the server;

wherein:

a mutation handler determines which data changes will be made in response to the user input based on information regarding causal relationships; and the mutation handler determines, in response to a second user liking a first user's profile, that a list of users who like the first user's profile or that a count of a total number of likes for the first user's profile will be updated.

2. The method of claim 1, wherein a query generator constructs a diff query to reduce an amount of the data requested by the request to only data that is missing in a local data store.

3. The method of claim 1, wherein a graphical user interface, in order to highlight an optimistic nature of the optimistic payload, presents the optimistic payload in a way that distinguishes the optimistic payload from a remainder of the webpage.

4. The method of claim 3, wherein the graphical user interface displays the optimistic payload with a different background color than the remainder of the webpage.

5. The method of claim 1, wherein the hierarchy of database queries has the top-level database query as a root.

6. The method of claim 5, the method further comprising traversing the hierarchy.

7. The method of claim 6, the method further comprising rendering a result of each database query along the hierarchy.

8. The method of claim 1, wherein the mutation handler, instead of immediately saving the data changes back into a local data store, first ensures that the data changes can be committed by the server into a master repository.

9. The method of claim 1, wherein the mutation handler de-queues a set of entries having a same transaction ID from an action queue and submits the data changes contained in the set of entries to the server at once for storage in a master repository.

10. The method of claim 9, wherein the mutation handler, in response to the server continuing to indicate a failure, instructs a graphical user interface to revert to a previous display using data in the set of entries.

11. The method of claim 10, wherein the mutation handler en-queues the set of entries again for resubmission to the server later.

12. The method of claim 1, wherein the hierarchy of database queries specifies the top-level database query for a viewer associated with a specific news feed, a database query for a list of stories, and a database query for each story within the list of stories.

13. A system for retrieving data managed by a server for graphical rendering, comprising:

a graphical user interface, including an input device and an output device; and a processor and memory, configured to cooperate to function as:

a first receiving unit configured to retrieve a request for a webpage including a set of graphical items via the input device;

a collecting unit configured to collect a hierarchy of database queries for fetching data used for rendering the webpage by:
converting a uniform resource locator for the webpage into a top-level database query; and
expanding the top-level database query based on composition relationships to collect the hierarchy of database queries for fetching the data used for rendering the requested webpage;
a submitting unit configured to submit the hierarchy of database queries in a batch to the server;
a second receiving unit configured to receive a group of query results corresponding to the hierarchy of database queries from the server;
wherein:
the graphical user interface is configured to display the graphical items using the group of query results;
the second receiving unit is further configured to receive user input interacting with the graphical content;
the graphical user interface is configured to display, in response to receiving the user input, an optimistic payload of what a user would expect to see in response to the request for the webpage to enable the user to see data changes prior to the data changes being processed by the server; and
a mutation handler is configured to determine which data changes will be made in response to the user input based on information regarding causal relationships;
the mutation handler determines, in response to a second user liking a first user's profile, that a list of users who like the first user's profile or that a count of a total number of likes for the first user's profile will be updated.

14. The system of claim 13, wherein the hierarchy of database queries forms a hierarchy based on the composition relationships, with the top-level database query as a root.

15. The system of claim 13, wherein the processor and memory are further configured to cooperate to function as:
an adding unit that adds an entry to a query history table for each database query of the hierarchy of database queries after the hierarchy of database queries is submitted to the server;
wherein the entry includes a submission time and information describing a respective query.

16. The system of claim 15, wherein the processor and memory are further configured to cooperate to function as a deleting unit that deletes the entry from the query history table for each of the database queries of the hierarchy of database queries when a query result corresponding to the respective database query indicates a failure or when the entry reaches a specific retention threshold.

17. The system of claim 13, wherein the processor and memory are further configured to cooperate to function as a storing unit that stores the group of query results in a local data store.

18. The system of claim 17, wherein the graphical user interface is configured to retrieve the group of query results from the local data store and to render the group of query results.

19. The system of claim 13, wherein the system comprises a smart mobile device.

20. A computer-readable storage medium storing computer-executable instructions that, when executed, cause a computer to perform a method of retrieving data managed by a server for graphical rendering, the method comprising:
receiving a request for a webpage including graphical content;
collecting a hierarchy of database queries for fetching data used for rendering the webpage by:
converting a uniform resource locator for the webpage into a top-level database query; and
expanding the top-level database query based on composition relationships to collect the hierarchy of database queries for fetching the data used for rendering the requested webpage;
submitting the hierarchy of database queries in a batch to the server;
receiving a set of query results corresponding to the hierarchy of database queries from the server; and
displaying the graphical content using the set of query results;
receiving user input interacting with the graphical content;
displaying, in response to receiving the user input, an optimistic payload of what a user would expect to see in response to the request for the webpage to enable the user to see data changes prior to the data changes being processed by the server;
wherein:
a mutation handler determines which data changes will be made in response to user input;
the mutation handler determines, in response to a second user liking a first user's profile, that a list of users who like the first user's profile or that a count of a total number of likes for the first user's profile will be updated.

* * * * *